Feb. 11, 1958 J. A. AUSTIN ET AL 2,822,750
BALE PRESS
Filed March 15, 1956 2 Sheets-Sheet 1

INVENTORS
E. PRUITT
J. A. AUSTIN

BY *Ayats Dowell*
ATTORNEY

Feb. 11, 1958 J. A. AUSTIN ET AL 2,822,750
BALE PRESS
Filed March 15, 1956 2 Sheets-Sheet 2
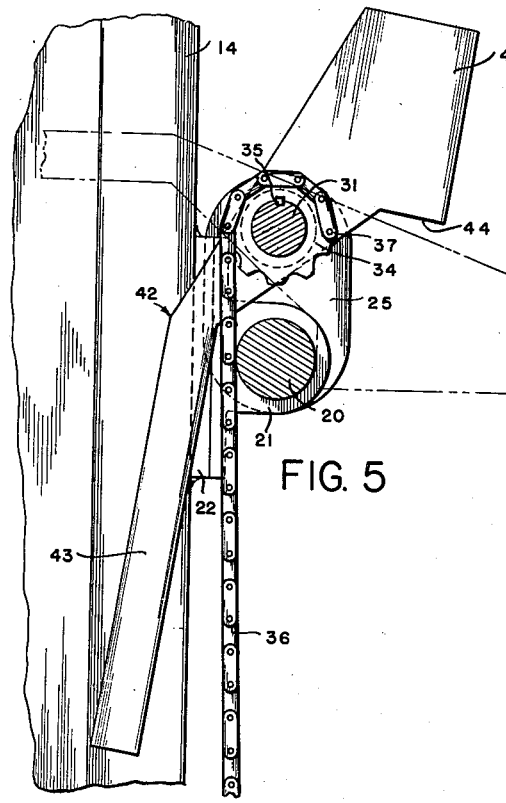
FIG. 5
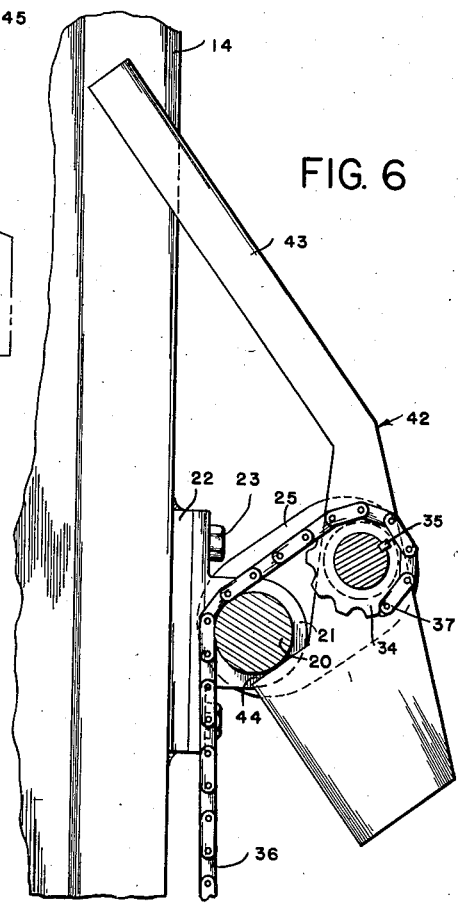
FIG. 6
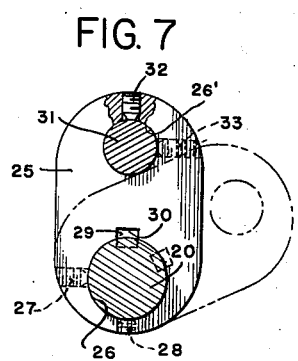
FIG. 7
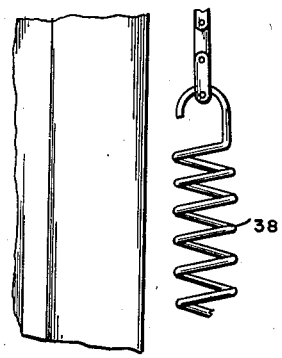
INVENTORS
E. PRUITT
J. A. AUSTIN
BY
ATTORNEY

United States Patent Office 2,822,750
Patented Feb. 11, 1958

2,822,750

BALE PRESS

John A. Austin, Maricopa, and Ernest Pruitt, Chandler, Ariz., assignors to Producers Cotton Oil Company of Arizona, Phoenix, Ariz.

Application March 15, 1956, Serial No. 571,744

6 Claims. (Cl. 100—220)

The present invention relates to baling apparatus and more particularly to the dog means and the operating mechanism therefor for retaining material being baled in a bale forming chamber while increments of material are being added in the formation of a complete bale.

Heretofore, various means have been employed to maintain material being baled, such as cotton linters, in a bale forming chamber. The linters are partially compressed by a reciprocating tamper while increments of material, such as linters, are added in the formation of the bale. Various types of movable projections called dogs, extending into the bale forming chamber, have been provided for this purpose but none has been entirely satisfactory. Excessive costs of manufacture, the difficulty of installing and servicing, the frequency of breakdowns, and the inadequacy of holding down sufficient quantity of the linters in the baling chamber, have been some of the objections which resulted in low capacity of prior baling apparatus.

An object of the present invention is to overcome the deficiencies of prior baling equipment and provide effective material retaining dogs for bale presses.

A further object of the present invention is to provide material retaining dogs and operating mechanism therefor for replacement in existing bale presses and also for use on original equipment.

Another object of the invention is to provide cotton linters retaining dogs which do not interfere with the filling of a bale forming chamber but which maintain the material in proper relation during the filling of the bale chamber and which may be pushed aside during the ramming operation without damage to the bale and which will return to operative position.

A further object is to provide material retaining dogs which have a maximum projection into the bale forming chamber and which may be completely removed from the bale forming chamber without increasing the outside dimensions of the supporting structure.

Figure 1:
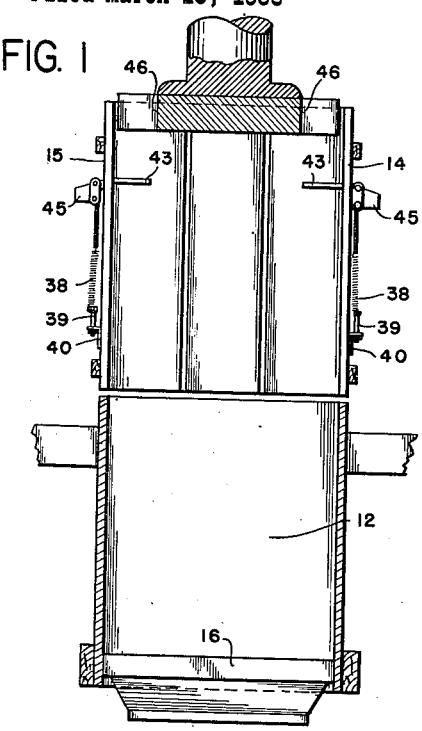
Figure 2:
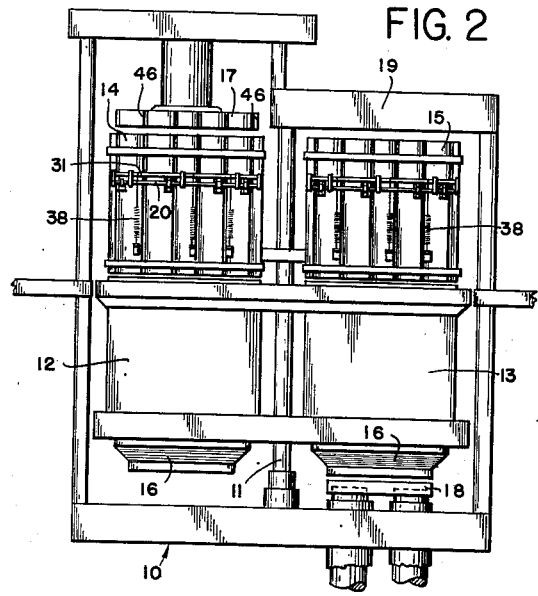
Figure 3:
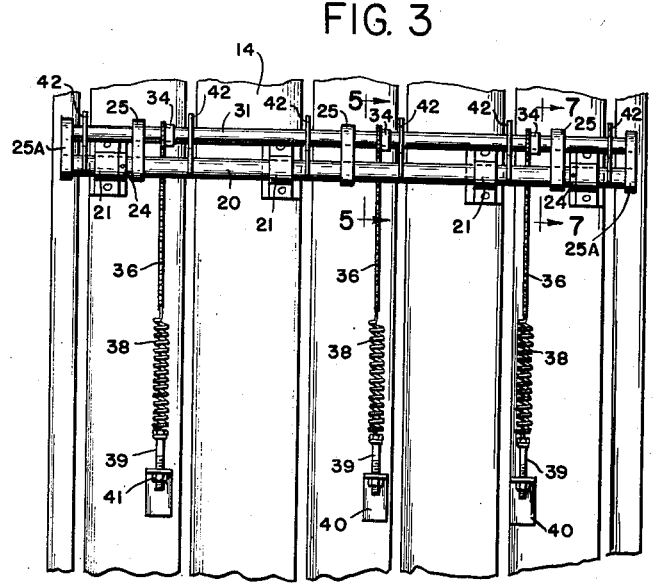
Figure 4:
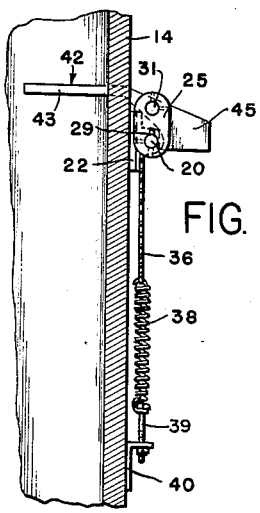

Other and further objects will be apparent as the description proceeds and upon reference to the accompanying drawings wherein:

Fig. 1 is an end elevation view of one of the bale forming chambers with parts omitted and one end wall omitted showing the dogs tamper and ram in operative position;

Fig. 2, a front elevation view of the bale forming press with the retaining dogs and operating mechanism mounted on the removable doors thereof;

Fig. 3, an enlarged front elevation view of the operating mechanism for the retaining dogs and showing the outer end of such dogs;

Fig. 4, a transverse sectional view of a fragment of the press box showing the material retaining dogs in operative position;

Fig. 5, an enlarged sectional view taken substantially on line 5—5 of Fig. 3 with a portion of the press box door omitted to show the entire retaining dog in a position to allow increments of material to be added to the bale forming chamber;

Fig. 6, a sectional view similar to Fig. 5 and illustrating the retaining dog in the position assumed during the operation of the ram compressing the bale to its final shape;

Fig. 7, a fragmentary sectional view taken substantially on line 7—7 of Fig. 3 showing the plate-like levers in their normal position and a dotted line showing of such plate-like levers in the position assumed when the lint retaining dogs are pushed aside by the compressed bale in the ramming operation.

Briefly stated, the present invention comprises a retainer dog having a retainer portion projecting through a slot in the door of a bale chamber and pivoted about a transverse axis. A plate lever pivoted on a transverse axis spaced from the transverse axis of said dog supports the transverse pivot axis of the dog and such lever is urged to a normally vertical position, the dog being yieldably retained in a horizontal effective position by a counterweight on the dog whereby the dog may be moved in a direction to admit material into the bale forming chamber without restriction, the dog retaining the material in the bale forming chamber with a strong yieldable force, such yieldable force being obtained by a suitable spring acting on the plate lever. After the material is collected in sufficient quantity in the bale forming chamber such filled chamber is moved to the ramming position and the ram then compresses such material into a tightly compressed bale, the retaining dogs being pushed aside during such ramming, returning to their original position after ramming.

Referring more particularly to the drawing, a bale press includes a framework 10 in which a vertically arranged rotatably mounted shaft 11 carries a bale forming chamber 12 on one side and a bale forming chamber 13 on the other side, said bale forming chambers each having removable doors 14 and 15 through which the bale is removed after completion, such doors being mounted for movement out of the way to provide access to the completed bale. At the bottom of each bale forming chamber, a vertically movable piston-like bottom wall 16 supports the material during the formation of the bale while a tamping device 17 at the top of the bale compresses the increments of material into the bale forming chamber immediately therebelow, material being baled being periodically fed into the bale forming chamber 12 between the tamping operations in a well known manner until sufficient material for a bale has been accumulated. Thereafter, the tamp 46 is raised out of the bale forming chamber 12 and such chamber is swung over to the position of bale forming chamber 13 where the bottom wall 16 of the bale is immediately above ram 18 and is then pushed upwardly by a ram 18 which moves the piston-like bottom wall 16 of the chamber upwardly, compressing the bale between a top abutment member 19 of the bale press framework 10 and the movable wall 16. The binding wires or strands are secured to the bale and the doors 14 and 15 moved outwardly and the completed bale removed from the press.

The specific improvement of the present invention relates more particularly to the baling material retaining dogs and the operating mechanism therefor. Since the dogs and operating mechanism is the same for each door, only one door, namely, the door 14 and its dogs and operating mechanism will be specifically described, the unit on the door 15 being substantially identical. A shaft 20 is rotatably mounted in spaced pillow bearings 21 secured to and spaced from the door 14 by means of base plates 22 suitably welded or otherwise secured to the door 14, the bearings 21 being secured by cap screws 23 passing through the webs of pillow bearings 21 and threaded into the base plates 22. To prevent endwise movement of the shaft 20, collars 24 abutting the opposite sides of certain of the bearings 21 are secured to the shaft by set screws or the like, thereby maintaining the shaft against axial displacement.

A plurality of lever plates 25 each having spaced shaft receiving bores 26 and 26' at opposite ends thereof are mounted with the bores 26 receiving the shaft 20, said lever plates being maintained in parallel relation by means of set screws 27, 28 and the end lever plates 25A, 25A being additionally secured to shaft 20 by means of keys 29 received in corresponding keyways at the ends of shaft 20 and the keyway slot 30 in the lever plates. A sprocket shaft 31 arranged in spaced parallel relation to shaft 20 is fixedly mounted in the bores 21 of the lever plates 25 by means of set screws 32, 33, whereby the parallel relation is maintained between the main shaft 20 and the members or sprocket shaft 31. A plurality of sprockets 34 are fixed to the shaft 31 by means of keys 35 and/or set screws for maintaining such sprockets in fixed relation to the shaft 31 and thereby in fixed relation to the shaft 20, and it will therefore be understood that the lever plates 25, shafts 20 and 31 and sprockets 34 are in effect an integral unit after assembly.

A plurality of chains 36, one for each sprocket 34, have their one ends 37 fixed to their associated sprocket 34 by welding or the like, and the other ends of each chain are connected to associated tension coil springs 38. The lower end of each coil spring is secured to a threaded anchor bolt 39 passing through a horizontal portion of an anchor angle bracket 40 fixedly secured to the door 14 by any suitable means such as bolts, welding or the like, and it will be evident that the tension in the spring 38 may be controlled by adjustment of a nut 41 on the bolt 39 which secured the bolt 39 to its bracket 40.

Upon shaft 31 a plurality of material retaining dogs 42 are mounted. Each retaining dog 42 is of "chair-shape" operatively shown in a horizontal position with the "back" 43 projecting through suitable slots in the door 14 of the bale forming chamber. The "seat" portion 44 of the dog is adapted to abut against the shaft 20 as shown in phantom lines in Fig. 5 and shown in full lines in Fig. 6. Each dog is provided with an aperture adjacent to the junction of the "seat" portion 44 and the "back" portion 43 which loosely receive the shaft 31 upon which such dogs are pivotally mounted, the "leg" portions 45 of the chair-shaped retaining dogs 42 serving as counterweights and being of sufficient weight with relation to the "back" portions 43 to maintain such dogs 42 in their horizontal position, shown in Fig. 4 and shown in dash-dot-dot lines in Fig. 5.

From the above description it is believed that the operation of the improved retaining dog and its operating mechanism should be obvious. Material is fed into the bale forming chamber 12 through the upper end thereof while the tamp 17 is out of the way, and after sufficient material has been added the tamp 17 is operated compressing the material being baled within the chamber 12, the tamp 17 passing freely past the retaining portions 43, 43 of the dogs 42, as suitable slots are provided in the tamp 17 for such free passage. It will be observed that the counterbalance of the dogs 42 is readily overcome by a small downward force such as the weight of material being baled on the retaining portion 43 of the dogs, thereby avoiding interference with the loading of the bale forming chamber, the dogs remaining effective to prevent the material from moving upwardly beyond such dogs, thereby facilitating the formation of bales of acceptable size and weight. After the bale forming chamber 12 has received as much material as required, such chamber is moved to the positition of bale forming chamber 13 in Fig. 2 and the ram 18 is operated thereby pushing up the bottom wall 16 and compressing material in the bale forming chamber between such bottom 16 and the top member 19 of the bale press frame. When the material has been compressed, the doors 14 and 15 may be moved out of the way and the bale may be bound by the usual strands and thereafter the completed bale may be removed from the baling press for storage and shipment. In the meantime bale chamber 13 which is now in the left position can be filled and tamped for a second bale.

During the operation of the ram 18 in compressing the material in the upper portion of the bale forming chamber, the retaining portions 43 of the dogs 42 are pushed out of the bale forming chamber as shown in Fig. 6, by the force of the material of the bale, such pushing being resisted by the tension of the spring 38 acting through chain 36 and sprocket 37, the tension of such spring being adjusted to produce the proper operating characteristics. As soon as the bale is removed and the doors replaced, the dogs 42 assume their horizontal position and are ready for the formation of the next bale.

Although this baling equipment is particularly successful in baling cotton, it should be useful for baling other materials.

It will be obvious to those skilled in the art that various changes may be made in the invention without departing from the spirit and scope thereof and therefore the invention is not limited by that which is illustrated in the drawings and described in the specification, but only as indicated in the appended claims.

What is claimed is:

1. Material retaining means for a baler press comprising a main shaft of a length approximately equal to the width of a bale door, bearings supporting said shaft for pivotal movement, means to secure said bearings to the bale door adjacent the upper end thereof, a pair of collars on said shaft for cooperation with opposed portions of said bearings to prevent endwise movement of the shaft, a plurality of lever plates each having a first aperture at one end for receiving said shaft and a second aperture at the other end for receiving a sprocket shaft, means fixing said lever plates on said main shaft, a sprocket shaft mounted in the second apertures in said lever plates and being fixed against rotation therein, a plurality of sprockets fixedly mounted in spaced relation on said sprocket shaft, a chain on each sprocket having an end fixed to its associated sprocket and extending between the plane defined by said sprocket shaft and said main shaft when the sprocket shaft is above the main shaft and the bale door, a spring secured to the other end of each chain and an anchor bolt fixed to the free end of each spring, anchoring brackets mounted on said door through which the anchor bolts extend, means for adjusting the tension of said springs by means of the anchor bolts, and a plurality of chair-shaped retaining dogs having back and seat portions and having apertures therethrough adjacent the intersection of the back and the seat portions, said dogs being freely rotatably mounted on said sprocket shaft, the seat portion of such dogs being adapted to contact the main shaft to limit movement in one direction, the leg portion of the chair-shaped dog being of sufficient weight to cause the seat portion to normally engage the main shaft and maintain the back portion of the dog in a horizontally retaining position, said bale press door having slots through which the dogs project into the baling chamber, said dogs being completely withdrawable from the chamber to permit the baling ram to fully compress a bale.

2. A dog for use in baling presses comprising a first pivot means, means to support said first pivot means on a bale press door, a second pivot means, a lever connecting said first and second pivot means whereby said second pivot means may move in an arcuate path about said first pivot means, a member on said second pivot means, a flexible element having one end fixed to said member on said second pivot means and passing between said first pivot means and the bale press door, means for exerting a continuous pressure on said flexible element for restoring said second pivot means closely adjacent said bale press door, and a dog freely pivotally connected to said second pivot means and having a retainer portion projecting into the bale chamber, said dog being so formed as to normally assume a position for retaining the material to be baled within the baling chamber.

3. A bale press retaining dog operating mechanism comprising pivot means for mounting on a door of a bale press, a lever pivotally mounted on said pivot means and projecting in the direction from which material is fed into the bale chamber, a pivot member on said lever, a material retainer pivotally mounted on the pivot member on said lever and normally projecting transversely of the direction of movement of material fed into the chamber and adapted to swing about said pivot member on said lever in the direction of feeding movement, means to maintain said lever and said retaining means in operative position and strongly opposing movement of said retainer in a direction opposite the direction of feeding movement but permitting such opposite movement upon the exertion of a substantially increased force.

4. A retainer for a baling press comprising pivot means for mounting on a door of a press, a lever mounted on said pivot means for swinging movement in a vertical plane, a retaining dog pivotally mounted on said lever on an axis spaced from said pivot means with said spaced axis adapted to swing about the axis of the pivot means, said retaining dog having stop means thereon for limiting movement in one direction and being so formed as to be readily moveable in the other direction, a flexible element fixedly connected at one end to said lever and extending between said pivot means and the inner surface of the door of the bale press, and means for exerting a force on said flexible member for strongly urging and maintaining said lever in the position in which said retainer is maintained in operative position, said force exerting means permitting said retainer to be moved in a direction to swing said spaced pivot away from said baling chamber when a force of predetermined value required to overcome said easily yieldable means is greater than that applied to said retainer.

5. A bale press comprising a housing forming a bale chamber, said housing having removable doors for the removal of bales formed in the chamber, a first shaft pivotally mounted to a door, a second shaft spaced from said first shaft and fixedly connected to said first shaft, a plurality of retaining dogs loosely pivoted on said second shaft and having a retainer portion projecting into said chamber through slots in the door, said dogs being so formed as to normally maintain the retainer portions thereof in a horizontal position, a flexible strand fixed by suitable attaching means at one end to said second shaft and passing between said first shaft and said door, means to exert a yieldable tension on said flexible strand for urging said second shaft toward said door, stop means on said dog cooperating with said second shaft whereby upward movement of said retainer portion of said dog will cause said dog to move said stop into operative relation to said second shaft about said first shaft and the retainer portion of said dog will rapidly be pushed out of said chamber.

6. A lint retainer for a bale forming chamber comprising a base member for mounting on the wall of a bale chamber, a lever, means to pivotally connect one end of said lever for movement about a fixed axis on said base member, a lint retainer dog pivotally connected to the other end of said lever and adapted to project into the bale chamber, said lever being adapted to engage the wall of the bale press chamber for limiting the pivotal movement of said lever in the direction of the dog projection into the bale chamber, said dog being so formed as to normally be maintained in a generally horizontal position when the lever is in the position of dog projection into the bale chamber, and cooperating abutment means on said dog and said lever for preventing relative movement between said dog and said lever in one direction while permitting said dog to pivot about the other end of said lever in the opposite direction without movement of said lever, and strong though yieldable means for urging said lever into contact with the wall of the bale press chamber whereby said dog may assume its normal horizontal position.

References Cited in the file of this patent
UNITED STATES PATENTS

| | | |
|---|---|---|
| 2,237,721 | Wallace | Apr. 8, 1941 |
| 2,727,458 | Hauswirth et al. | Dec. 20, 1955 |
| 2,757,601 | Deems | Aug. 7, 1956 |